(12) United States Patent
Verma et al.

(10) Patent No.: US 11,483,102 B1
(45) Date of Patent: Oct. 25, 2022

(54) REVIEW AND RETRY FOR MINIMUM SPEED PORT CHANNEL

(71) Applicant: Arista Networks, Inc., Santa Clara, CA (US)

(72) Inventors: Utkarsha Verma, Santa Clara, CA (US); Victor Wen, San Jose, CA (US); Vamsi Anne, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/341,905

(22) Filed: Jun. 8, 2021

Related U.S. Application Data

(60) Provisional application No. 63/170,138, filed on Apr. 2, 2021.

(51) Int. Cl.
| | | |
|---|---|---|
| *H04L 1/00* | (2006.01) | |
| *H04L 1/18* | (2006.01) | |
| *H04L 1/20* | (2006.01) | |
| *H04L 69/16* | (2022.01) | |

(52) U.S. Cl.
CPC ............ *H04L 1/188* (2013.01); *H04L 1/208* (2013.01); *H04L 69/162* (2013.01)

(58) Field of Classification Search
None
See application file for complete search history.

(56) References Cited

U.S. PATENT DOCUMENTS

| | | | | |
|---|---|---|---|---|
| 6,374,115 | B1 * | 4/2002 | Barnes | H04W 84/08 455/524 |
| 7,558,874 | B1 * | 7/2009 | Kodukula | H04L 41/0896 713/320 |
| 2013/0308455 | A1 * | 11/2013 | Kapadia | H04L 47/125 370/235 |
| 2018/0054355 | A1 * | 2/2018 | Balser | H04L 41/0806 |
| 2018/0115469 | A1 * | 4/2018 | Erickson | H04L 43/026 |
| 2021/0028987 | A1 * | 1/2021 | Krivenok | H04L 41/0869 |
| 2021/0218628 | A1 * | 7/2021 | Kaliyamoorthy | G06F 16/27 |

* cited by examiner

*Primary Examiner* — Mujtaba M Chaudry
(74) *Attorney, Agent, or Firm* — Fountainhead Law Group PC

(57) ABSTRACT

A review and retry mechanism ensures a port channel can be configured to provide and maintain a minimum data speed. A timer-based review sequence reviews the constituent interfaces of a port channel to determine if a minimum speed requirement is met. If the minimum speed cannot be fulfilled, the port-channel member interfaces are un-programmed and removed from the port-channel, rendering the port-channel functionally inactive, thereby preventing network traffic loss. A timer-based retry sequence attempts to program the constituent interfaces. The minimum speed requirement of the interfaces is checked in the next review cycle. If the minimum speed requirement is met, then the review and retry mechanism halts and the port channel continues to remain active; otherwise, the interfaces are un-programmed and the process repeats.

20 Claims, 4 Drawing Sheets

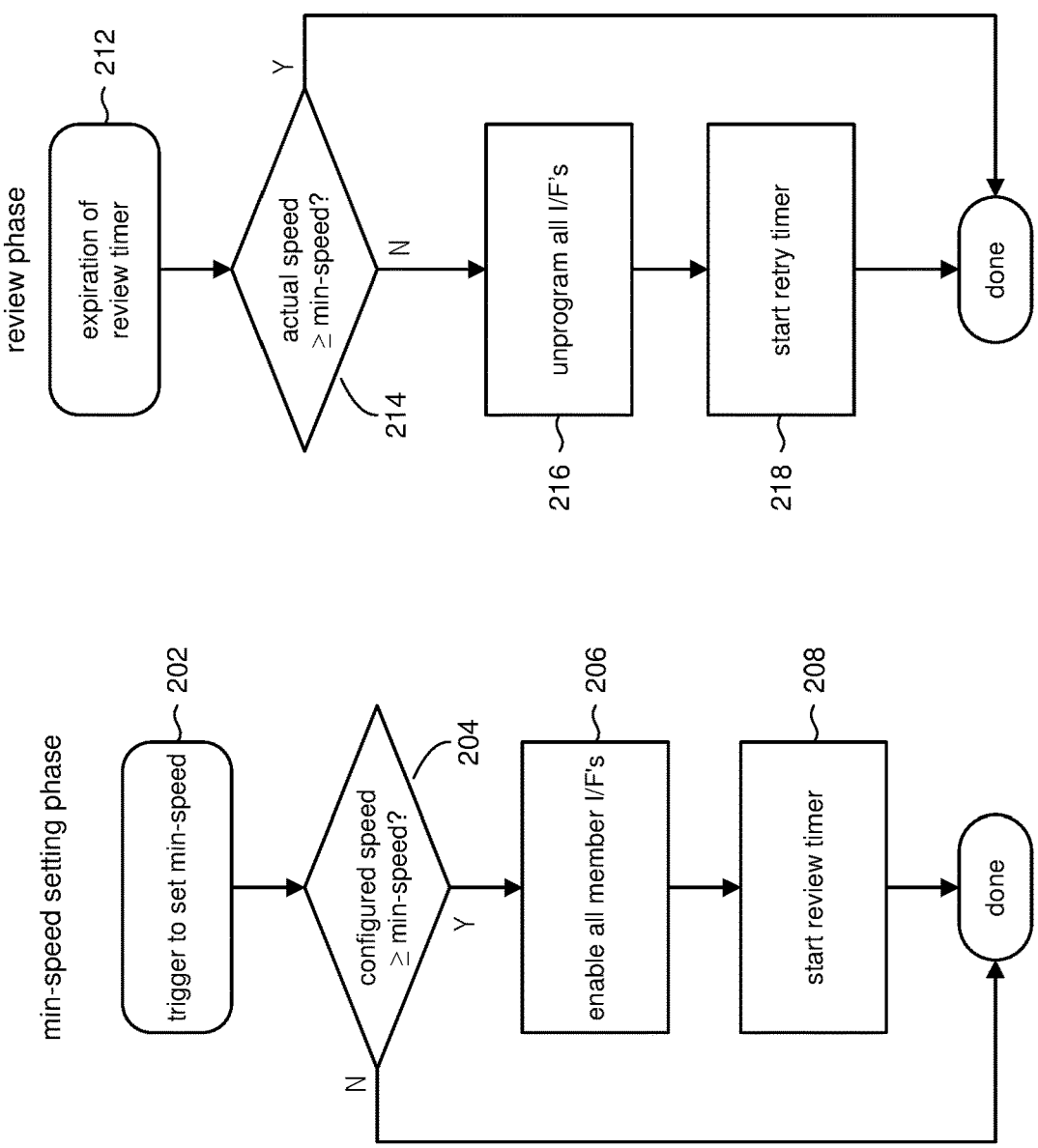

REVIEW AND RETRY FOR MINIMUM SPEED PORT CHANNEL

CROSS REFERENCE TO RELATED APPLICATIONS

Pursuant to 35 U.S.C. § 119(e), this application is entitled to and claims the benefit of the filing date of U.S. Provisional App. No. 63/170,138 filed Apr. 2, 2021, the content of which is incorporated herein by reference in its entirety for all purposes.

BACKGROUND

The present disclosure relates to port channels. A port channel is a virtual interface which generally refers to an aggregate of one or more interfaces (Ethernet ports) on a switch to provide improved performance such as higher bandwidth, load balancing, link redundancy, and the like. A port channel can be referred to as a channel group, a link aggregation group (LAG), and the like.

A port channel provides a communication link between two devices supported by matching channel group interfaces on each device. The port channel can be established between a switch and another switch or between a switch and a host.

The "speed" of a port channel refers to the sum of the speeds (bandwidth or data rate) of the port channel's constituent interfaces; the interfaces in the channel group. For example, suppose a port channel comprises the following interfaces and data rates (generally specified as bits per second): Et1 (10 Gbps), Et4 (1 Gbps), and Et7 (5 Gbps). The speed of the port channel would be 10+1+5=16 Gbps.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 2A, 2B, 2C illustrate high level operations in accordance with some embodiments of the present disclosure.

DETAILED DESCRIPTION

Figure 1:
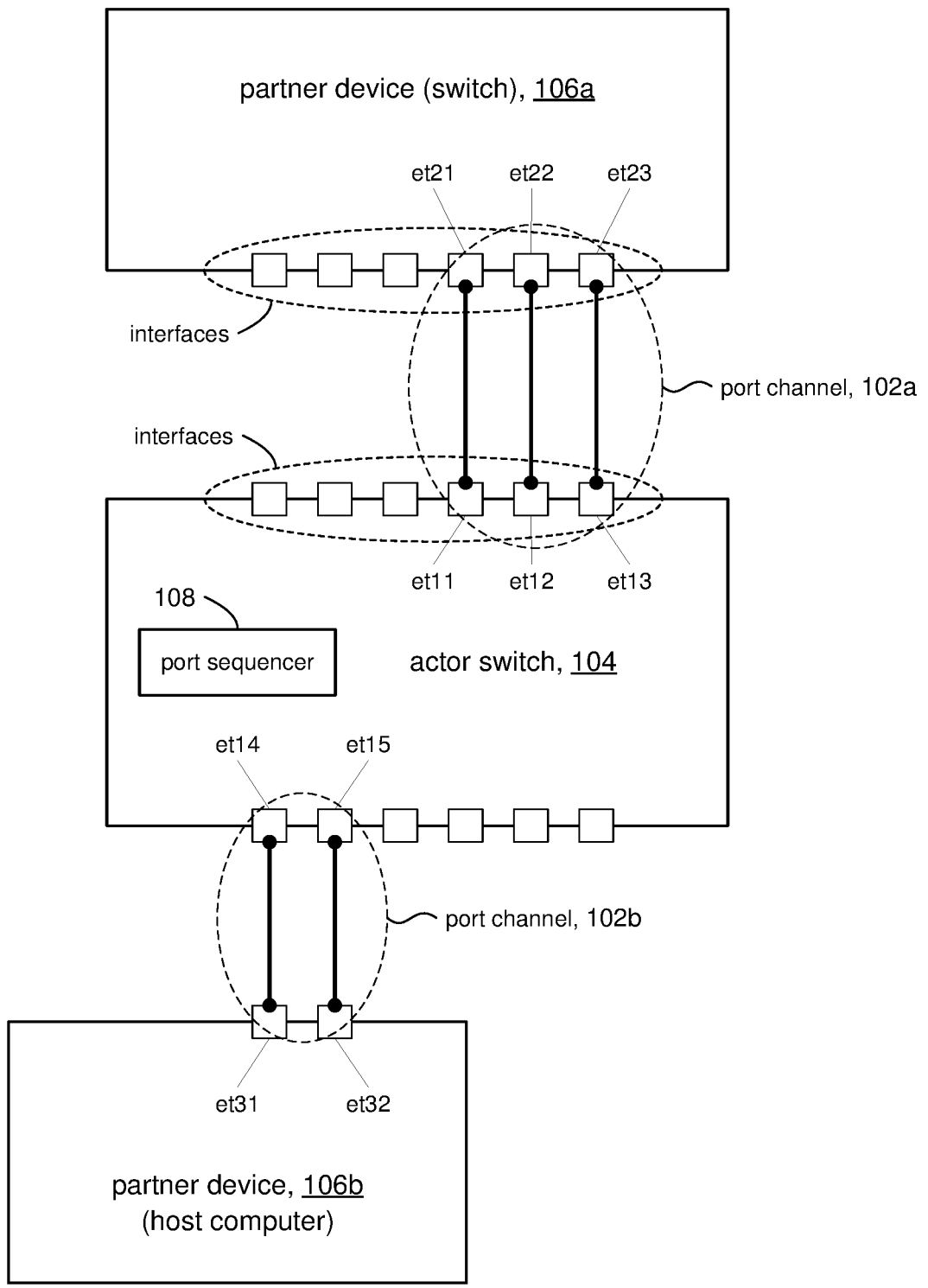
FIG. 1 shows an illustrative example to explain configuring a port channel in accordance with the present disclosure.

As noted above a port channel can be set up between a switch and another switch or between a switch and a host (e.g., a server). For discussion purposes, the present disclosure will refer to a switch-to-switch configuration with the understanding that the present disclosure is also applicable to a switch-to-host configuration.

In some configurations, when a port channel between two switches (actor and partner) is first configured, corresponding member interfaces on each switch perform a Link Aggregation Control Protocol (LACP) negotiation to program the member interfaces to a state of "collecting" (meaning ready to receive packets) and "distributing" (meaning ready to transmit packets) before they are declared "active" in the port channel. Conventionally, the port channel's speed is checked to see if the channel group can provide a minimum speed (min-speed) required for the port channel. If the minimum speed requirement is satisfied, then LACP negotiation is performed on each member interface to program interfaces comprising the port channel.

While going through LACP negotiation, it is possible that some of the interfaces on one switch (actor), for one reason or another, cannot be fully (completely) programmed; in other words, not programmed at all or are programmed to the "collecting" state only and cannot proceed to be programmed to the "distributing" state. Accordingly, only some of the interfaces in the port channel may become active. So, from a hardware programming perspective, there may not be enough fully programmed interfaces (i.e., programmed to collecting and distributing state) to satisfy the minimum speed. Because of this, the port channel remains in a functional state referred to as "link-down" with some member interfaces either fully or only partially programmed. However, the partner switch can and will proceed to the "distributing" state according to the LACP protocol and complete its programming for all the interfaces, including the ones which are partially programmed on the actor switch. The partner switch will start sending traffic towards the actor which may not be able to bridge, route, or otherwise process the received traffic.

In some situations, the port channel on the actor can be functionally link-down but still have interfaces programmed partially or completely. This may cause problems with forwarding traffic on this port channel. For example, the partner may send the traffic on a partially programmed port channel which may then be blackholed on the actor switch. In other situations, the port channel on the actor can be functionally link-up but with less than the minimum required aggregate speed and therefore causing traffic congestion.

The present disclosure provides a timer-based review sequence which reviews and un-programs the member interfaces of a port channel to remove the member interfaces from the port channel if minimum speed requirements are not fulfilled, and a retry sequence to retry programming member interfaces of the port channel that have previously failed programming and were un-programmed from the port channel due to minimum speed requirements:

1. Perform a basic check to see if the configured member interfaces can satisfy minimum speed.
2. Proceed with LACP negotiation to program the member interfaces.
3. Review port channel member interfaces after a user-configurable "review timeout" to determine if the total speed of the interfaces which are fully programmed (collecting and distributing state) in the hardware satisfies the minimum speed requirement or not.
   a. If the programmed interfaces satisfy the minimum speed requirements. The process is done.
   b. If the programmed interfaces do not satisfy the minimum speed requirements, the interfaces are un-programmed in the hardware on the actor. This in turn will ensure that the partner also un-programs the port channel member interfaces after LACP PDU exchange. Thus, there is no eventual traffic blackholing.

4. A separate "retry timer" will periodically attempt to re-enable LACP negotiation on the interfaces which were originally stuck in the "collecting state" (partially programmed) hoping the issue gets resolved and these interfaces can get fully programmed. If the issue is actually resolved, and these interfaces plus the ones which were able to be fully programmed originally are able to satisfy the minimum speed requirements, then all the interfaces are re-enabled for LACP negotiation. Meanwhile, the "review-timer" will be running in the background, and it will verify and perform its actions as mentioned in point 3 above.

For LACP enabled port channels, the present disclosure supports minimum speed configuration—that is the total speed of all the interfaces configured in the port channel which is needed to bring the port channel up. The minimum speed feature is applicable for both:

a port channel with all member interfaces having the same speed a port channel with member interfaces having different speeds In accordance with the present disclosure, the feature is applicable to both static LAGs/port channels and LACP LAGs/port channels. The disclosed system will re-evaluate minimum speed on Collecting (programmed for Rx/receiving) and/or Distributing (programmed for Tx/transmitting) state changes. It will be appreciated that without this feature:

While programming the port-channel for the first time, if an interface cannot be programmed as part of the port channel, it is possible that the port channel would remain link-down with some member interfaces fully and partially programmed.

From a functionally link-up port channel, if a member interface got un-programmed due to some reason, the port channel may continue to remain link-up with lesser total speed than the configured minimum speed.

The minimum speed review and re-evaluation (retry) mechanism addresses such cases and automatically enforces minimum speed configuration.

For Collecting and/or Distributing state changes, embodiments of the disclosed system will evaluate minimum speed after a review-timeout that is user configurable. If the total speed of active member interfaces in the port channel is less than the configured minimum speed, the system will un-program the member interfaces (for example, remove the member interfaces from the port channel) and bring the port channel functionally down. In accordance with some embodiments, the system can inform a network administrator by logging a corresponding message indicating an interface having insufficient speed.

If additional (new) interfaces are configured and they are able to complete LACP negotiation and get programmed as Collecting and Distributing, the system will re-evaluate minimum speed on the port channel. If the total speed of new plus old member interfaces does not fulfil the minimum speed requirements, then the new member is not made active in the port channel and the port channel continues to stay link-down. If the total speed of new plus old member interfaces fulfils a minimum speed of the port channel, then the system will re-enable all the interfaces for that port channel to perform LACP negotiation. If sufficient member interfaces complete LACP negotiation such that the total speed fulfils the minimum speed requirement, the port channel will become functionally "link-up." After a review-timeout, provided that the minimum speed is fulfilled, the system can notify the user, for example, by logging an appropriate message. Otherwise, the system can bring the port channel link down and notify the user by logging the appropriate syslog message.

If any interface remains in the Collecting state, but not in the Distributing state for the duration of the review-timeout, the system will move the interface out of the Collecting state. In an embodiment, the system will periodically re-enable the interface for LACP negotiation after a retry-timeout (e.g., 360 seconds) until it can progress to Collecting and Distributing. Meanwhile, if the port channel becomes "link-up" because a sufficient number of interfaces entered Collecting and Distributing states, the system will enable the interface for LACP negotiation.

If minimum speed is reduced for a port channel that is link-down due to minimum speed, and there are sufficient interfaces to satisfy minimum speed requirements, then the system will re-enable the interfaces configured in that port channel to perform LACP negotiation. After a review-timeout, if the minimum speed condition is satisfied, the system will log an appropriate syslog message to indicate the condition is satisfied and the port channel will continue to remain link-up. Otherwise, the system will log an appropriate syslog message to indicate the condition is not satisfied, and the system will un-program the interfaces, bringing the port channel functionally link down.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

FIG. 1 shows examples of port channels (logical links) 102a, 102b between actor switch 104 and two partner devices 106a, 106b. A partner device can be another switch (106a) or a host computer (106b). Port channel 102b between actor switch 104 and host computer 106b comprises wired connections between physical interfaces (physical links) et14, et15 on the actor switch and respective interfaces et31, et32 on the host computer partner device. Likewise, port channel 102a between the actor switch and the partner switch comprises three wired connections between physical interfaces et11, et12, et13 on the actor switch and respective interfaces et21, et22, et23 on the partner switch. Interfaces comprising a port channel can be referred to as member interfaces or simply members. The actor switch will be referred to herein as actor, and similarly partner device will be referred to as partner.

Typically, a port channel negotiation sequence is performed to bring up a port channel between actor and partner. Link Aggregation Control Protocol (LACP) is an example of a protocol that specifies a well-defined negotiation sequence, and is commonly used to bundle several physical links together to form a port channel. LACP will be the example whenever reference is made to port channel negotiation or bringing up member interfaces in a port channel, with the understanding that the present disclosure can be adapted to variants of LACP, other similar protocols, and processes.

In some embodiments, negotiation is performed for each pair of member interfaces comprising the port channel, where corresponding respective pairs of members on the actor and on the partner negotiate a sequence of operational states. For example, consider the port channel between the actor and the partner computer host. The port channel comprises member pair et14/et31 and member pair et15/et32. The actor will run a negotiation sequence on et14 and corresponding pair member et31 on the partner host computer, and another negotiation sequence on et15 with corresponding pair member et32 on the partner.

In some embodiments, the actor can deem the port channel to be "link-up" when it has completed all its negotiation sequences with the partner, and begin transmitting packets over the port channel. Likewise, the partner can deem the port channel to be "link-up" when it has completed its negotiation sequence with the actor, and begin transmitting packets over the port channel.

Actor 104 can include port sequencer logic 108 to control the state of each of its member interfaces in accordance with the present disclosure in connection with negotiating with corresponding members on the partner. Each pair of members between the actor and the partner exchange state information in order to become operational. For example, members et11 (actor) and et21 (partner) can exchange packets of state information with each other as each member progresses through a sequence of operational states to become an operational pair in the port channel.

In some embodiments, the port sequence logic in the actor can sequence a member interface (e.g., et11) through the following states during the negotiation sequence with its corresponding member in the partner:
  un-programmed—the interface is in an initial un-programmed state
  collecting—the interface is ready to receive packets from its corresponding interface in the partner
  collecting and distributing—the interface is ready to transmit packets to its corresponding interface in the partner, in addition to receiving packets.

It will be appreciated that in other embodiments, the present disclosure can be adapted to process additional states.

The discussion will now turn to a description of sequencing the state of member interfaces in a port channel in accordance with the present disclosure. The port sequencer logic represents a collection of processes or threads to perform sequencing operations in accordance with the present disclosure. For discussion purposes, LACP will be used when an example for port channel negotiation between actor and partner is required. Further, for discussion purposes, a member interface that is programmed to the collecting state (intermediate communication state) will be referred to as a "partially programmed" member. A member interface that is programmed to both the collecting and distributing state (final communication state) will be referred to as a "fully programmed" member.

It will be appreciated that, in some embodiments, port channel negotiation between actor and partner can involve intermediate states in addition to the collecting state and the collecting/distributing state. Although disclosed embodiments in accordance with the present disclosure account for these two states, it will be appreciated that the present disclosure can be adapted to process additional intermediate states.

FIGS. 2A, 2B, and 2C show a high level representation of operations and processing by the actor switch to manage the states of the member interfaces comprising a port channel in accordance with the present disclosure. In some embodiments, for example, the actor can include computer executable program code, which when executed by a processor (e.g., 408, FIG. 4), can cause the actor to perform processing in accordance with FIGS. 2A, 2B, and 2C.

The operation and decision blocks described below can be allocated for execution among one or more concurrently executing processes and/or threads. For example, FIG. 2A can represent a process or thread to perform initial processing on a port channel in response to setting a minimum speed (min-speed) parameter. As explained below, FIG. 2B can represent a process or thread that is invoked in response to expiration of a review timer, and FIG. 2C can represent a process or thread that is invoked in response to expiration of a retry timer. These processes or threads are collectively represented in FIG. 1 as the port sequencer logic.

FIG. 2A

At operation 202, the actor triggers setting the min-speed for the port channel. The min-speed setting specifies a minimum data speed of the port channel, and can be expressed in suitable units such as bits per second (bps, e.g., 1 Gbps, 5 Gbps, etc.). It will be appreciated that any of a number of activities can trigger a min-speed configuration. For example, setting the min-speed can be triggered when a port channel is first configured, when a member interface is configured, and so on. Setting the min-speed can also be triggered when a user manually changes the min-speed setting for an already configured port channel. In some embodiments, for example, a user (e.g., network administrator) can set the min-speed setting using a suitable command line interface (CLI), for example, over a maintenance port, via a central controller, using a web application, and so on.

At decision point 204, further processing can be based on a quantity referred to as the "configured speed" of the port channel. Each interface on the actor has an associated data speed. The configured speed of the port channel can be defined as the sum of the individual data speeds of the member interfaces on the actor that comprise the port channel. If the configured speed of the port channel is less than the min-speed, then processing can be deemed complete. If the configured speed of the port channel is greater than or equal to the min-speed, then processing can continue to operation 206. If the configured speed does not meet min-speed, then further processing is not required because the port channel as configured cannot meet the specified min-speed. For example, suppose a port channel is configured with three members, each capable of 1 Gbps, then the configured speed is 3 Gbps. If the min-speed is set at 5 Gbps, then the configured speed of this port channel is less than the specified min-speed. In some embodiments, the actor switch can respond to the user with a suitable error message, and processing relating to the present disclosure can be deemed complete.

At operation 206, when the configured speed of the port channel meets the min-speed, the actor enables all the member interfaces for negotiation and programming. As noted above, bringing up a port channel includes negotiating with the partner to bring up the respective pairs of member interfaces on the actor and the partner. During negotiation, the actor can program the member interfaces to advance their respective states from an initial "un-programmed" state to a final collecting and distributing state during the negotiation process with the corresponding member interface on the partner. In some embodiments, there can be one or more intermediate states. For example, in the case of LACP, there can be an intermediate collecting state.

At operation 208 the actor initiates a review timer. In some embodiments, the review timer can run for a predetermined review time. For example, the review time can be a system default value that a user can change, for example, via a suitable CLI command. In a particular instance, for example, the review time is defaulted to 180 seconds. It is noted that some members may not be able to be successfully programmed to the collecting and distributing state. This aspect of the present disclosure is addressed below. Processing can be deemed complete.

FIG. 2B

At operation 212, the actor performs review operations (review phase) in response to the review timer expiring. For example, when the review timer expires, the actor can receive a notification in the form of an interrupt, or in some cases the actor can periodically poll the timer to know the current status, and so on. Note that the N branch of decision point 204 bypasses starting the review timer when the port channel does not meet the min-speed setting, in which case the review timer does not start and FIGS. 2B and 2C will not get triggered.

At decision point 214, if the actual speed of the port channel is greater than or equal to the min-speed, then processing can be deemed complete. If the actual speed of the port channel is less than the min-speed, then processing can continue to operation 216. The actual speed of the port channel is the sum of the constituent member interfaces that are in the collecting and distributing state.

At operation 216, when the actual speed of the port channel is less than the min-speed, the actor un-programs all the member interfaces comprising the port channel. As noted above, the actual speed of the port channel is the sum of the constituent member interfaces that are fully programmed. For example, suppose a member of a port channel gets "stuck" in the collecting state (partially programmed member) and the actor cannot program the member to the collecting and distributing state (fully programmed member); e.g., due to miswiring, hardware issues in the switch, negotiation issue with the partner, etc. As such, the actual speed of the port channel would be computed without that partially programmed member. Accordingly, the actual speed may not meet the min-speed setting absent the partially programmed member. Nonetheless, because some members on the actor side are fully programmed, the partner may be able to complete its port channel negotiating sequence and deem the port channel to be link-up. However, because not all members on the actor can transmit, the data speed of the port channel will be less than min-speed. In accordance with the present disclosure, the actor can un-program all the member interfaces of the port channel when the actual speed of the port channel is less than the min-speed. This prevents the partner from designating the port channel to be link-up so that the port channel is not used by either the actor or the partner. Additional detail of this aspect of the present disclosure in accordance with some embodiments is described below.

At operation 218, the actor initiates a retry timer. In some embodiments, the retry timer can run a timer for a predetermined retry time. For example, the retry time can be a fixed system default value. In some embodiments, the retry time can be user programmable, for example, via a suitable CLI command. In a particular instance, for example, the retry time is defaulted to 600 seconds. The retry timer provides a delay to allow partially programmed interfaces to clear their issues. Processing in the review phase can be deemed complete.

FIG. 2C

At operation 222, the actor performs retry operations (retry phase) in response to the retry timer expiring. For example, when the retry timer expires, the actor can receive a notification in the form of an interrupt, or in some cases the actor can periodically poll the timer to know the current status, and so on. Note that the Y branch of decision point 214 bypasses starting the retry timer when the port channel meets the min-speed setting, in which case the retry timer does not trigger the operations of FIG. 2C.

At operation 224, the actor enables one or more member interfaces for negotiation and programming to retry programming the member interfaces. As noted above, bringing up a port channel includes negotiating with the partner to bring up the respective pairs of member interfaces on the actor and the partner. During negotiation, the actor in some embodiments, can program the member interfaces to advance their respective states from the collecting state to the collecting and distributing state while negotiating with the corresponding member interface on the partner. Additional detail of this aspect of the present disclosure in accordance with some embodiments is described below.

At operation 226 the actor initiates another instance of the review timer. Processing in the retry phase can be deemed complete.

In accordance with some embodiments, the processing shown in FIGS. 2B and 2C can be initiated in response to the actor detecting a state change in a member of the port channel. For example, the actor can initiate an instance of the review timer which will invoke FIG. 2B and the subsequent processing that follows.

The discussion will now turn to a more detailed description of sequencing the state of member interfaces in a port channel in accordance with the present disclosure. The port sequencer logic represents a collection of processes or threads to perform sequencing operations in accordance with the present disclosure. It will be appreciated that in some embodiments, the partner device can be configured to operate in accordance with the present disclosure.

Figures 3A, 3B, 3C:
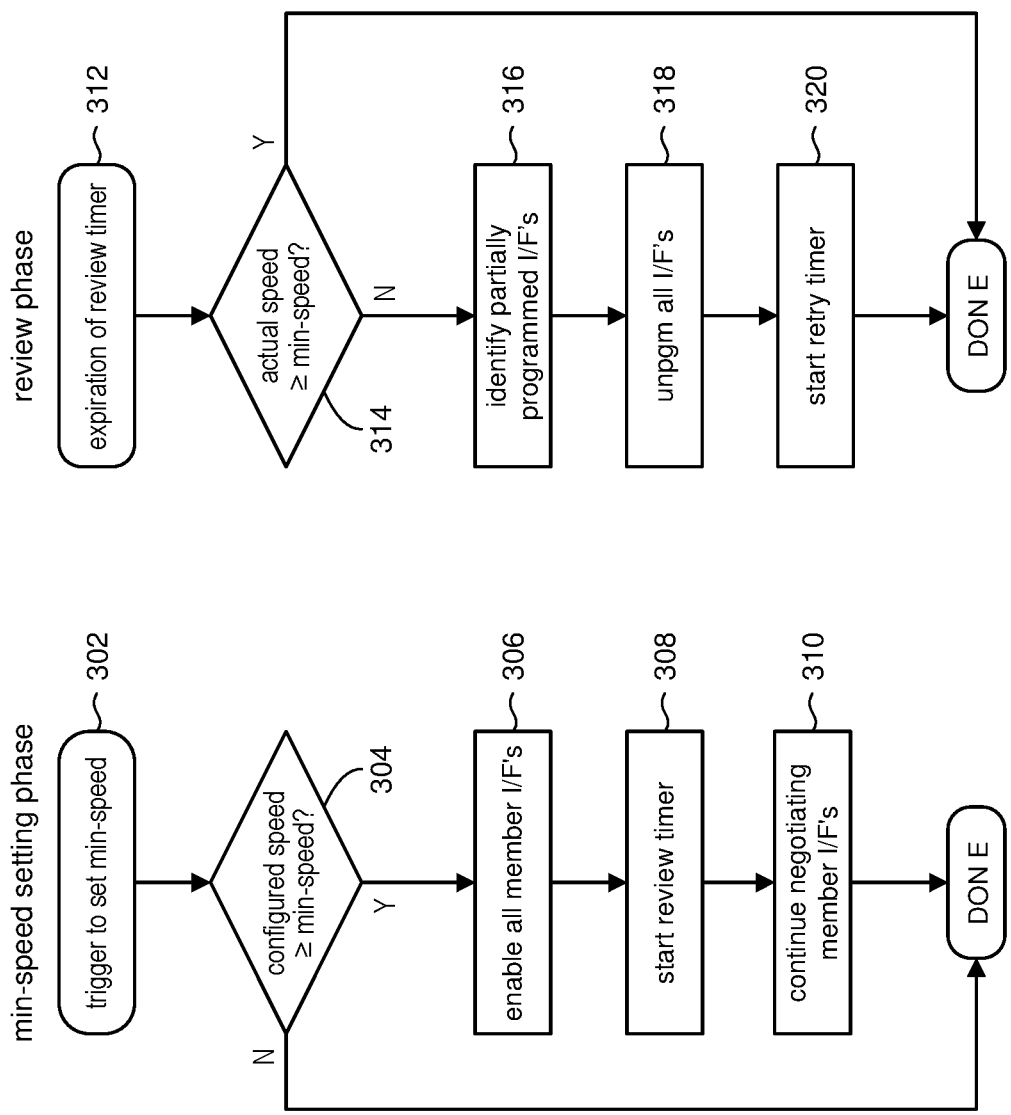
FIGS. 3A, 3B, 3C illustrate high level operations in accordance with some embodiments of the present disclosure.

FIGS. 3A, 3B, and 3C show operations and processing by the actor switch to manage the states of the member interfaces comprising a port channel in accordance with the present disclosure. In some embodiments, for example, the actor can include computer executable program code, which when executed by a processor (e.g., 408, FIG. 4), can cause the actor to perform processing in accordance with FIGS. 3A, 3B, and 3C.

The operation and decision blocks described below can be allocated for execution among one or more concurrently executing processes and/or threads. For example, FIG. 3A can represent a process or thread to perform initial processing on a port channel in response to setting a minimum speed (min-speed) parameter. As explained below, FIG. 3B can represent a process or thread that is invoked in response to expiration of a review timer, and FIG. 3C can represent a process or thread that is invoked in response to expiration of a retry timer. These processes or threads are collectively represented in FIG. 1 as the port sequencer logic.

FIG. 3A

At operation 302, the actor triggers setting the min-speed for the port channel, as explained in operation 202.

At decision point 304, if the configured speed of the port channel is less than the min-speed, then processing can be deemed complete. If the configured speed of the port channel is greater than or equal to the min-speed, then processing can continue to operation 306. As explained above, the sum of the individual data speeds of the member interfaces comprising the port channel represents the configured speed of the port channel. If the configured speed does not meet min-speed, then further processing is not required because the port channel as configured cannot meet the specified min-speed. In some embodiments, the actor switch can respond to the user with a suitable error message, and processing relating to the present disclosure can be deemed complete.

At operation 306, when the configured speed of the port channel meets the min-speed, the actor enables all the member interfaces of the port channel for negotiation and programming. As noted above, bringing up a port channel includes negotiating with the partner to bring up the respective pairs of member interfaces on the actor and the partner. During negotiation, the actor in some embodiments, can program the member interfaces to advance their respective states from an initial "un-programmed" state to an intermediate partially programmed state during the negotiation process with the corresponding member interface on the partner.

At operation 308 the actor initiates a review timer when at least one member I/F has reached the collecting state. In some embodiments, the review timer can run for a predetermined period of time, referred to herein as the review time. For example, the review time can be a system default value that a user can change via a suitable CLI command. In a particular instance, for example, the review time is defaulted to 180 seconds. In accordance with some embodiments, the review timer can be a background process so that the actor switch can continue with other activities.

At operation 310, the actor continues negotiating the member interfaces. As the actor continues negotiating the port channel with the partner, the actor will program the member interfaces to advance their respective states from the collecting state to a final collecting and distributing state. It is noted that some members may not be able to be successfully programmed to the collecting and distributing state. This aspect of the present disclosure is addressed below. Processing can be deemed complete.

FIG. 3B

At operation 312, the actor performs review operations (review phase) in response to the review timer expiring. For example, when the review timer expires, the actor can receive a notification in the form of an interrupt, or in some cases the actor can periodically poll the timer to know the current status, and so on. Note that the N branch of decision point 304 bypasses starting the review timer when the port channel does not meet the min-speed setting, in which case the review timer does not start and the operations of FIG. 3B and FIG. 3C are not triggered.

At decision point 314, if the actual speed of the port channel is greater than or equal to the min-speed, then processing can be deemed complete. If the actual speed of the port channel is less than the min-speed, then processing can continue to operation 316.

At operation 316, when the actual speed of the port channel is less than the min-speed, the actor identifies any partially programmed member interfaces in the port channel, including any interfaces that could not be programmed to the collecting state. As explained above, a port channel is brought up by negotiating each pair of member interfaces comprising the port channel, where corresponding respective pairs of members on the actor and on the partner negotiate a sequence of operational states. Each member interface on the actor negotiates with a corresponding member on the partner and advances through a sequence of operational states as a result of the negotiation. Some of the actor-side member interfaces may not advance to the collecting and distributing state (e.g., the member may get stuck in the collecting state) or may not even reach the collecting state, and can be referred to as partially programmed member interfaces. Member interfaces that are in the collecting and distributing state can be referred to as fully programmed member interfaces.

In accordance with the present disclosure, the actor can identify such partially programmed interfaces to be handled in the retry phase.

At operation 318, the actor un-programs all the member interfaces comprising the port channel. Recall that in some embodiments, the actual speed of the port channel is the sum of those member interfaces that are in the collecting and distributing state. Accordingly, the actual speed of the port channel may not meet the min-speed due to the presence of one or more partially programmed members. Nonetheless, because some members on the actor side are fully programmed, the partner may be able to complete its port channel negotiating sequence and deem the port channel to be link-up. However, because not all members on the actor can transmit, the data speed of the port channel will be less than min-speed. In accordance with the present disclosure, the actor can un-program all the member interfaces comprising the port channel when the actual speed of the port channel is less than the min-speed. Doing so prevents the partner from designating the port channel to be link-up so that the port channel is not used by either the actor or the partner.

At operation 320, the actor initiates a retry timer as discussed above in connection with operation 218. Processing in the review phase can be deemed complete.

FIG. 3C

At operation 322, the actor performs retry operations (retry phase) in response to the retry timer expiring. For example, when the retry timer expires, the actor can receive a notification in the form of an interrupt, or in some cases the actor can periodically poll the timer to know the current status, and so on. Note that the Y branch of decision point 314 bypasses starting the retry timer when the port channel meets the min-speed setting, in which case the operations of FIG. 3C will not be triggered.

At operation 324, the actor enables the previously identified partially programmed member interfaces (operation 316) for negotiation and programming. Recall that all member interfaces of the port channel, including the previously identified member interfaces, had been un-programmed at operation 318. Accordingly, with the present disclosure, the actor can enable each of the previously identified interfaces, now un-programmed, to begin negotiating with their corresponding interfaces on the partner to advance these interfaces from their un-programmed state to the collecting state.

At operation 326, the actor initiates another instance of the review timer when at least one of the previously identified member interfaces has been programmed to the collecting state.

At operation 328, the actor continues negotiating and programming the previously identified interfaces to attempt advancing those interfaces to the fully programmed collecting and distributing state. In some embodiments, for example, the actor can continue negotiating each of the previously identified interfaces with their corresponding interfaces on the partner to advance the previously identified interfaces to the collecting and distributing state.

At decision point 330, if an "effective speed" of the port channel is greater than or equal to the min-speed setting, the processing can continue to operation 322. As used herein, the term "effective speed" refers to the sum of (1) the speeds of any previously identified partially programmed interfaces that are now fully programmed and (2) the speed of the interfaces that were previously determined at operation 316 as being fully programmed. If the effective speed is less than the min-speed setting, then processing in the retry phase can be deemed complete. Note that an effective speed that does not meet the min-speed setting indicates some of the previously identified partially programmed interfaces could not be fully programmed. Because the review timer was initiated at operation 326, such interfaces will be identified in the review phase.

At operation 332, when the effective speed meets the min-speed setting, this indicates that enough of the previously identified partially programmed interfaces have been successfully fully programmed such that enabling the interfaces that were previously determined as being fully programmed should result in a port channel that meets the min-speed setting. Accordingly, the actor enables the interfaces that were previously determined as being fully programmed for negotiation and programming. In some embodiments, for example, the actor can begin negotiating each such interface with its corresponding interface on the partner to advance its state to fully programmed. Processing in the retry phase can be deemed complete. Note that some interfaces that were previously determined to be fully programmed may fail to become fully programmed. Because the review timer was initiated at operation 326, such interfaces will be identified in the review phase.

In accordance with some embodiments, the processing shown in FIGS. 3B and 3C can be initiated in response to the actor detecting a state change in a member of the port channel. For example, the actor can initiate an instance of the review timer which will invoke FIG. 3B and the subsequent processing that follows.

Figure 4:
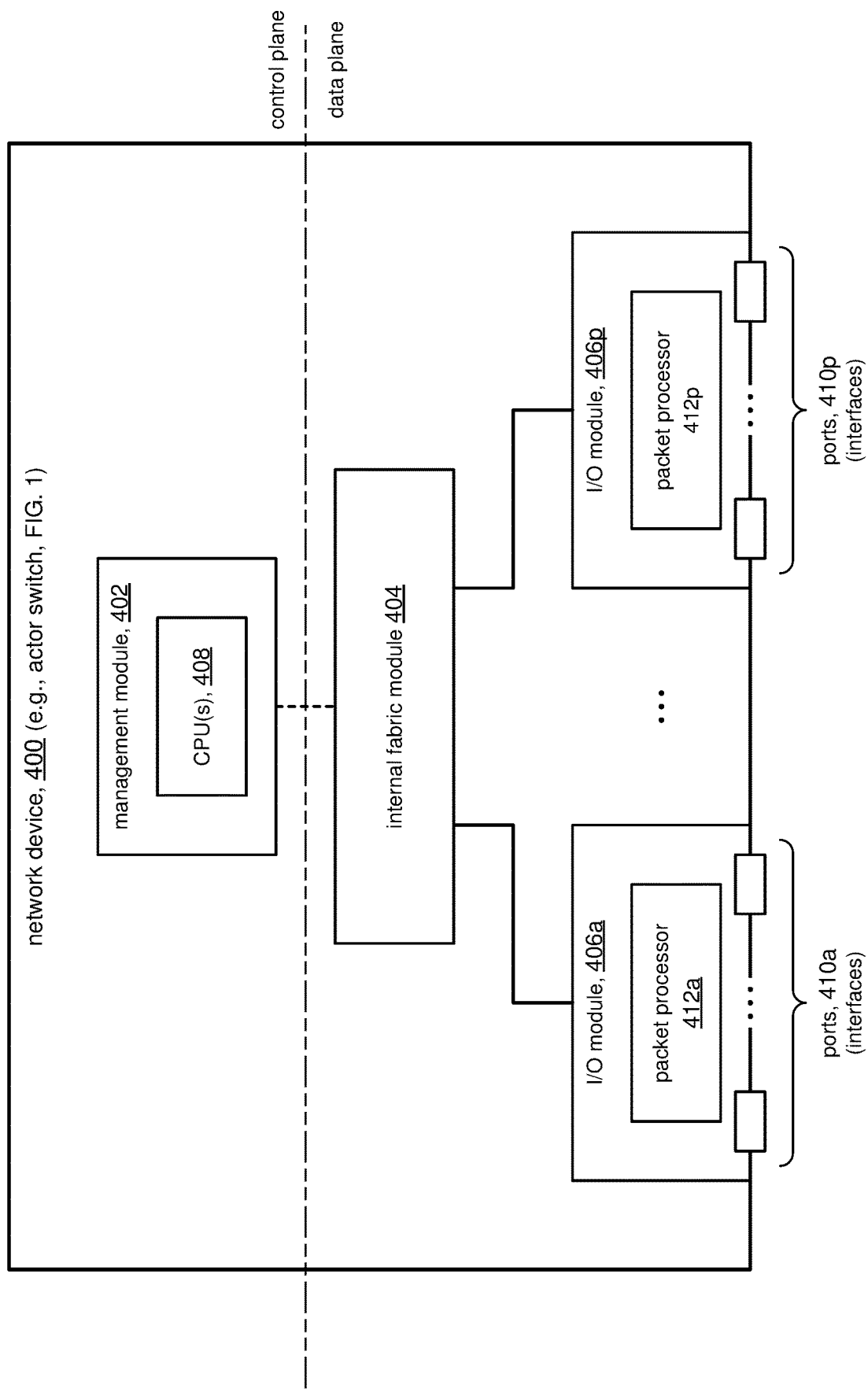
FIG. 4 shows a network device of the present disclosure.

The discussion will now turn to a description of various failure scenarios to illustrate processing by the actor to verify that the port channel meets the min-speed setting in accordance with the present disclosure. Each scenario begins with the following configuration/initial conditions:
 the port channel is configured with four 1 Gbps (member) interfaces et1, et2, et3, et4
 initially, et1 and et2 can be fully programmed
 initially, et3 and et4 can only be partially programmed
 min-speed is set to 4 Gbps Scenario 1
In this scenario, we consider the following situation:
 et1, et2 remain in a condition that they can be fully programmed after having been un-programmed
 the condition of et3, et4 changes so they can be fully programmed
Initial Configuration
 enable negotiation and programming for all four member interfaces
 start review timer when at least one member reaches collecting state
 NOTE—min-speed will not be met because et3 and et4 are only partially programmed
First Review Phase (Review Timer Expires)
 detect that actual speed of port channel is less than min-speed due to et3 and et4 being partially programmed (decision 314)
 identify partially programmed members to be et3, et4 (operation 316)
 un-program all members (operation 318)
 start retry timer—this gives time for the condition(s) that limited et3 and et4 to the partially programmed state to correct
First Retry Phase (Retry Timer Expires)
 enable partially programmed members et3 and et4, which are currently un-programmed, for negotiation/programming (operation 324)
 start review timer when at least one member reaches collecting state (operation 326)
 continue negotiation/programming of et3 and et4 (operation 328)
 detect that the et3, et4 are fully programmed and the effective speed meets min-speed (decision 330)
 enable previous fully programmed members et1 and et2, which are currently un-programmed, for negotiation/programming (operation 332)
 NOTE—for this scenario, et3 and et4 will become fully programmed, the port channel will be reviewed for min-speed when the review timer expires
Second Review Phase (Review Timer Expires)
 detect that actual speed of port channel is greater than or equal to min-speed
 the port channel remains link-up, with all the members active in it Scenario 2
In this scenario, we consider the following situation:
 et1, et2 remain in a condition that they can be fully programmed after having been un-programmed
 et3, et4 changes so they can be fully programmed, but not until after an additional review/retry cycle
Initial Configuration
 enable negotiation and programming for all four member interfaces
 start review timer when at least one member reaches collecting state
 NOTE—min-speed will not be met because et3 and et4 are only partially programmed
First Review Phase (Review Timer Expires)
 detect that actual speed of port channel is less than min-speed due to et3 and et4 being partially programmed
 identify partially programmed members to be et3, et4
 un-program all members
 start retry timer—this gives time for the condition(s) that limited et3 and et4 to the partially programmed state to correct
First Retry Phase (Retry Timer Expires)
 enable partially programmed members et3 and et4, which are currently un-programmed, for negotiation/programming
 start review timer when at least one member reaches collecting state
 continue negotiation/programming of et3 and et4
 detect that the et3, et4 are partially programmed and the effective speed does not meet min-speed
 NOTE—for this scenario, et3 and et4 again only reach the partially programmed state, so min-speed will not be met; et1 and et2 are not enabled (operation 332 is bypassed)
Second Review Phase (Review Timer Expires)
 detect that actual speed of port channel is less than min-speed due to et3 and et4 still being partially programmed
 identify partially programmed members to be et3, et4 (again)
 un-program et3 and et4, noting that et1 and et2 had been un-programmed and had not been re-enabled for negotiation/programming start retry timer—this provides another chance for the condition(s) that limited et3 and et4 to the partially programmed state to correct Second Retry Phase (Retry Timer Expires)
enable partially programmed members et3 and et4, which are currently un-programmed, for negotiation/programming
start review timer when at least one member reaches collecting state
continue negotiation/programming of et3 and et4
detect that the et3, et4 are fully programmed and the effective speed meets min-speed
enable previous fully programmed members et1 and et2, which are still un-programmed, for negotiation/programming
NOTE—for this scenario et3 and et4 will become fully programmed, the port channel will be reviewed for min-speed when the review timer expires Third Review Phase (Review Timer Expires)
detect that actual speed of port channel is greater than or equal to min-speed
the port channel remains link-up, with all the members active in it Scenario 3
In this scenario, we consider the following situation:
et2 remains in a condition that it can be fully programmed after having been un-programmed
the condition of et3, et4 changes so they can be fully programmed
the condition of et1 changes so that it cannot be fully programmed after having been un-programmed Initial Configuration
enable negotiation and programming for all four member interfaces
start review timer when at least one member reaches collecting state
NOTE—min-speed will not be met because et3 and et4 are only partially programmed First Review Phase (Review Timer Expires)
detect that actual speed of port channel is less than min-speed due to et3 and et4 being partially programmed
identify partially programmed members to be et3, et4
un-program all members
start retry timer—this gives time for the condition(s) that limited et3 and et4 to the partially programmed state to correct First Retry Phase (Retry Timer Expires)
enable partially programmed members et3 and et4, which are currently un-programmed, for negotiation/programming
start review timer when at least one member reaches collecting state
continue negotiation/programming of et3 and et4
detect that the et3, et4 are fully programmed and the effective speed meets min-speed
enable previous fully programmed members et1 and et2, which are currently un-programmed, for negotiation/programming
NOTE—recall from above that for this scenario the condition of et1 changes so that it cannot become fully programmed after having been un-programmed Second Review Phase (Review Timer Expires)
detect that actual speed of port channel is less than min-speed due to et1 being partially programmed
identify partially programmed members to be et1
un-program all members
start retry timer—this provides a chance for the condition(s) that limited et1 to the partially programmed state to correct Second Retry Phase (Retry Timer Expires)
enable partially programmed member et1, which is currently un-programmed, for negotiation/programming
start review timer when at least one member reaches collecting state
continue negotiation/programming of et1
detect that the et1 is fully programmed and the effective speed meets min-speed
enable previous fully programmed members et2, et3, et4, which are un-programmed, for negotiation/programming
NOTE—assume that et2-et4 remain good, and et1 becomes good Third Review Phase (Review Timer Expires)
detect that actual speed of port channel is greater than or equal to min-speed
the port channel remains link-up, with all the members active in it FIG. 4 depicts an example of a network device 400 in accordance with some embodiments of the present disclosure. In some embodiments, network device 400 can be a switch (e.g., actor switch, FIG. 1). As shown, network device 400 includes a management module 402, an internal fabric module 404, and a number of I/O modules 406a-406p. Management module 402 includes the control plane (also referred to as control layer) of network device 400 and can include one or more management CPUs 408 for managing and controlling operation of network device 400 in accordance with the present disclosure. Each management CPU 408 can be a general purpose processor, such as but not limited to an Intel®/AMD® x86 or ARM® processor, that operates under the control of software stored in a memory (not shown), such as dynamic random access memory (DRAM). Control plane refers to all the functions and processes that determine which path to use, such as routing protocols, spanning tree, and the like.

Internal fabric module 404 and I/O modules 406a-406p collectively represent the data plane of network device 400 (also referred to as data layer, forwarding plane, etc.). Internal fabric module 404 is configured to interconnect the various other modules of network device 400. Each I/O module 406a-406p includes one or more input/output ports (interfaces) 410a-410p that are used by network device 400 to send and receive network packets. Each I/O module 406a-406p can also include a packet processor 412a-412p. Each packet processor 412a-412p can comprise a forwarding hardware component (e.g., application specific integrated circuit (ASIC), field programmable array (FPGA), digital processing unit, graphics coprocessors, content-addressable memory, and the like) configured to make wire speed decisions on how to handle incoming (ingress) and outgoing (egress) network packets. In accordance with some embodiments some aspects of the present disclosure can be performed wholly within the data plane.

FURTHER EXAMPLES

In accordance with the present disclosure, a method in a network device for configuring a port channel comprising a plurality of member interfaces of the network device comprises (a) initiating a first timer to run for a first period of time; (b) in response to (i) expiration of the first timer and (ii) a communication speed of the port channel being less than a predetermined speed, wherein the communication speed is a sum of speeds associated with member interfaces in the plurality of member interfaces that are fully programmed, the method includes: (c) un-programming each of the plurality of member interfaces; (d) initiating a second timer to run for a second period of time; (e) in response to expiration of the second timer, enabling programming for each member interface in a first subset of the plurality of member interfaces followed by enabling programming for each member interface in a second subset of the plurality of member interfaces; and (f) initiating the first timer to run for the first period of time; and (g) performing one or more sets of operations (b)-(f) until the communication speed of the port channel is greater than or equal to the predetermined speed.

In some embodiments, the first subset comprises member interfaces that were not fully programmed upon expiration of the first timer, and the second subset comprises member interfaces that were fully programmed upon expiration of the first timer.

In some embodiments, the method further comprises enabling programming for each member interface in the second subset of the plurality of member interfaces when speeds associated with member interfaces in the first subset that become fully programmed plus speeds associated with member interfaces in the second subset is greater than or equal to the predetermined speed.

In some embodiments, when a given member interface is enabled for programming, the given member interface performs programming during running of the first timer.

In some embodiments, a given member interface can be programmed to a collecting state or a collecting and distributing state, wherein the given member interface is deemed to be fully programmed when it is in the collecting and distributing state.

In some embodiments, enabling programming for a given interface includes the given interface communicating with a corresponding interface on a second network device, wherein the communication results in the given interface becoming fully programmed or failing to become fully programmed.

In accordance with the present disclosure, a method in a network device for configuring a port channel, comprise: (a) enabling programming of each of a plurality of member interfaces of a port channel, wherein a member interface that is enabled for programming can be programmed to an intermediate communication state or a final communication state; (b) determining a communication speed of the port channel, wherein the communication speed of the port channel is computed as a sum of speeds of member interfaces that are programmed to the final communication state; (c) in response to the communication speed of the port channel being less than a threshold speed, un-programming each of the plurality of member interfaces; and (d) enabling programming of one or more of the plurality of member interfaces.

In some embodiments, the operations (b)-(d) are repeated until the communication speed of the port channel is greater than or equal to the threshold speed.

In some embodiments, the method further comprises delaying for a first period of time between operations (a) and (b). In some embodiments, the method further comprises performing programming operations during the first period of time on member interfaces that are enabled for programming.

In some embodiments, the one or more of the plurality of member interfaces are member interfaces that were not programmed to the final communication state prior to un-programming each of the plurality of member interfaces.

In some embodiments, enabling programming of one or more of the plurality of member interfaces in operation (d) includes enabling programming only for member interfaces that were not programmed to the final communication state. In some embodiments, the method further comprises enabling for programming member interfaces that could be programmed to the final communication state subsequent to enabling programming only for member interfaces that were not programmed to the final communication state.

In some embodiments, enabling programming for a given interface includes the given interface communicating with a corresponding interface on a second network device, wherein the communication results in the given interface becoming programmed to the final communication state or failing to be programmed to the final communication state.

In accordance with the present disclosure, a network device comprises: a plurality of interfaces; one or more computer processors; and a computer-readable storage medium comprising instructions for controlling the one or more computer processors to: configure a port channel with a subset of the plurality of interfaces, including enable programming for all of the interfaces of the port channel; detect that a communication speed of a port channel is less than a predetermined threshold speed, wherein first interfaces of the port channel are deemed fully programmed and second interfaces of the port channel are deemed not fully programmed, wherein the communication speed of the port channel is a sum of speeds associated with the first interfaces of the port channel; in response to detecting that the communication speed of the port channel is less than the predetermined threshold speed, un-program all of the interfaces of the port channel; and at a time subsequent to un-programming each of the interfaces of the port channel, re-enable programming of the interfaces of the port channel.

In some embodiments, re-enabling programming of the interfaces of the port channel includes re-enabling programming of the second interfaces of the port channel only, followed by re-enabling programming of the first interfaces of the port channel. In some embodiments, the computer-readable storage medium further comprises instructions for controlling the one or more computer processors to re-enable programming of the first interfaces of the port channel only when speeds associated with the second interfaces that become fully programmed plus speeds associated with the first interface is greater than or equal to the predetermined threshold speed.

In some embodiments, when a given interface of the port channel is enabled for programming, the network device communicates with a corresponding interface on a second network device to which the given interface is connected, wherein the communication results in the given interface being fully programmed or not fully programmed.

In some embodiments, the computer-readable storage medium further comprises instructions for controlling the one or more computer processors to delay for a predetermined period of time prior to re-enabling programming of the interfaces of the port channel.

In some embodiments, a given member interface can be programmed to a collecting state or a collecting and distributing state, wherein the given member interface is deemed to be fully programmed when it is in the collecting and distributing state.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network device for configuring a port channel comprising a plurality of member interfaces of the network device, the method comprising:
   (a) initiating a first timer to run for a first period of time;
   (b) in response to (i) expiration of the first timer and (ii) a communication speed of the port channel being less than a predetermined speed, wherein the communication speed is a sum of speeds associated with member interfaces in the plurality of member interfaces that are fully programmed:
   (c) un-programming each of the plurality of member interfaces;
   (d) initiating a second timer to run for a second period of time;
   (e) in response to expiration of the second timer, enabling programming for each member interface in a first subset of the plurality of member interfaces followed by enabling programming for each member interface in a second subset of the plurality of member interfaces; and
   (f) initiating the first timer to run for the first period of time; and
   (g) performing one or more sets of operations (b)-(f) until the communication speed of the port channel is greater than or equal to the predetermined speed.

2. The method of claim 1, wherein the first subset comprises member interfaces that were not fully programmed upon expiration of the first timer, and the second subset comprises member interfaces that were fully programmed upon expiration of the first timer.

3. The method of claim 1, further comprising enabling programming for each member interface in the second subset of the plurality of member interfaces when speeds associated with member interfaces in the first subset that become fully programmed plus speeds associated with member interfaces in the second subset is greater than or equal to the predetermined speed.

4. The method of claim 1, wherein when a given member interface is enabled for programming, the given member interface performs programming during running of the first timer.

5. The method of claim 1, wherein a given member interface can be programmed to a collecting state or a collecting and distributing state, wherein the given member interface is deemed to be fully programmed when it is in the collecting and distributing state.

6. The method of claim 1, wherein enabling programming for a given interface includes the given interface communicating with a corresponding interface on a second network device, wherein the communication results in the given interface becoming fully programmed or failing to become fully programmed.

7. A method in a network device for configuring a port channel, the method comprising:
   (a) enabling programming of each of a plurality of member interfaces of a port channel, wherein a member interface that is enabled for programming can be programmed to an intermediate communication state or a final communication state;
   (b) determining a communication speed of the port channel, wherein the communication speed of the port channel is computed as a sum of speeds of member interfaces that are programmed to the final communication state;
   (c) in response to the communication speed of the port channel being less than a threshold speed, un-programming each of the plurality of member interfaces; and
   (d) enabling programming of one or more of the plurality of member interfaces.

8. The method of claim 7, wherein the operations (b)-(d) are repeated until the communication speed of the port channel is greater than or equal to the threshold speed.

9. The method of claim 7, further comprising delaying for a first period of time between operations (a) and (b).

10. The method of claim 9, further comprising performing programming operations during the first period of time on member interfaces that are enabled for programming.

11. The method of claim 7, wherein the one or more of the plurality of member interfaces are member interfaces that were not programmed to the final communication state prior to un-programming each of the plurality of member interfaces.

12. The method of claim 7, wherein enabling programming of one or more of the plurality of member interfaces in operation (d) includes enabling programming only for member interfaces that were not programmed to the final communication state.

13. The method of claim 12, further comprising enabling for programming member interfaces that could be programmed to the final communication state subsequent to enabling programming only for member interfaces that were not programmed to the final communication state.

14. The method of claim 7, wherein enabling programming for a given interface includes the given interface communicating with a corresponding interface on a second network device, wherein the communication results in the given interface becoming programmed to the final communication state or failing to be programmed to the final communication state.

15. A network device comprising:
   a plurality of interfaces;
   one or more computer processors; and
   a computer-readable storage medium comprising instructions for controlling the one or more computer processors to:
   configure a port channel with a subset of the plurality of interfaces, including enable programming for all of the interfaces of the port channel;
   detect that a communication speed of a port channel is less than a predetermined threshold speed, wherein first interfaces of the port channel are deemed fully programmed and second interfaces of the port channel are deemed not fully programmed, wherein the communication speed of the port channel is a sum of speeds associated with the first interfaces of the port channel;
   in response to detecting that the communication speed of the port channel is less than the predetermined threshold speed, un-program all of the interfaces of the port channel; and
   at a time subsequent to un-programming each of the interfaces of the port channel, re-enable programming of the interfaces of the port channel.

16. The network device of claim 15, wherein re-enabling programming of the interfaces of the port channel includes re-enabling programming of the second interfaces of the port channel only, followed by re-enabling programming of the first interfaces of the port channel.

17. The network device of claim 16, wherein the computer-readable storage medium further comprises instructions for controlling the one or more computer processors to re-enable programming of the first interfaces of the port channel only when speeds associated with the second interfaces that become fully programmed plus speeds associated with the first interface is greater than or equal to the predetermined threshold speed.

18. The network device of claim 15, wherein when a given interface of the port channel is enabled for programming, the network device communicates with a corresponding interface on a second network device to which the given interface is connected, wherein the communication results in the given interface being fully programmed or not fully programmed.

19. The network device of claim 15, wherein the computer-readable storage medium further comprises instructions for controlling the one or more computer processors to delay for a predetermined period of time prior to re-enabling programming of the interfaces of the port channel.

20. The network device of claim 15, wherein a given member interface can be programmed to a collecting state or a collecting and distributing state, wherein the given member interface is deemed to be fully programmed when it is in the collecting and distributing state.

* * * * *